United States Patent [19]
Lin

[11] Patent Number: 5,669,092
[45] Date of Patent: Sep. 23, 1997

[54] AIR MATTRESS STRUCTURE

[75] Inventor: Ping-Ting Lin, Taichung Hsien, Taiwan

[73] Assignee: Feng Yi Outdoor Leisure Equipment Enterprise Co., Ltd., Taichung Hsien, Taiwan

[21] Appl. No.: 611,795

[22] Filed: Mar. 6, 1996

[51] Int. Cl.[6] ................................................ A97C 27/08
[52] U.S. Cl. .................. 5/706; 5/698; 5/700; 5/420; 5/709
[58] Field of Search .................... 5/698, 699, 700, 5/701, 706, 709, 737, 740, 413 AM, 420

[56] References Cited

U.S. PATENT DOCUMENTS

| | | | |
|---|---|---|---|
| 3,818,521 | 6/1974 | Richard, Jr. | 5/698 |
| 4,025,974 | 5/1977 | Lea et al. | 5/209 |
| 4,450,193 | 5/1984 | Staebler | 5/420 X |
| 5,152,018 | 10/1992 | Lea | 5/420 |
| 5,226,384 | 7/1993 | Jordan | 5/420 X |

*Primary Examiner*—Michael F. Trettel
*Attorney, Agent, or Firm*—Bacon & Thomas

[57] ABSTRACT

A water-tight and heat-insulating air mattress structure having an air valve and a body made up of upper and lower layers, first and second LLDPE layers, first and second aluminum foil layers, and a nylon layer sandwiched there-between. The upper layer is applied on the first LLDPE layer which can retard the encroachment of water, while the first aluminum foil layer which can prevent the heat from dissipation is laminated between the first LLDPE layer and the nylon layer. The opposite layers, the lower layer and the second LLDPE and second aluminum layers, are applied in the same order as the above layers, and thus laminating and sandwiching the nylon layer there-between to form an air mattress structure with the advantages of both water-tight and heat-insulating.

3 Claims, 4 Drawing Sheets

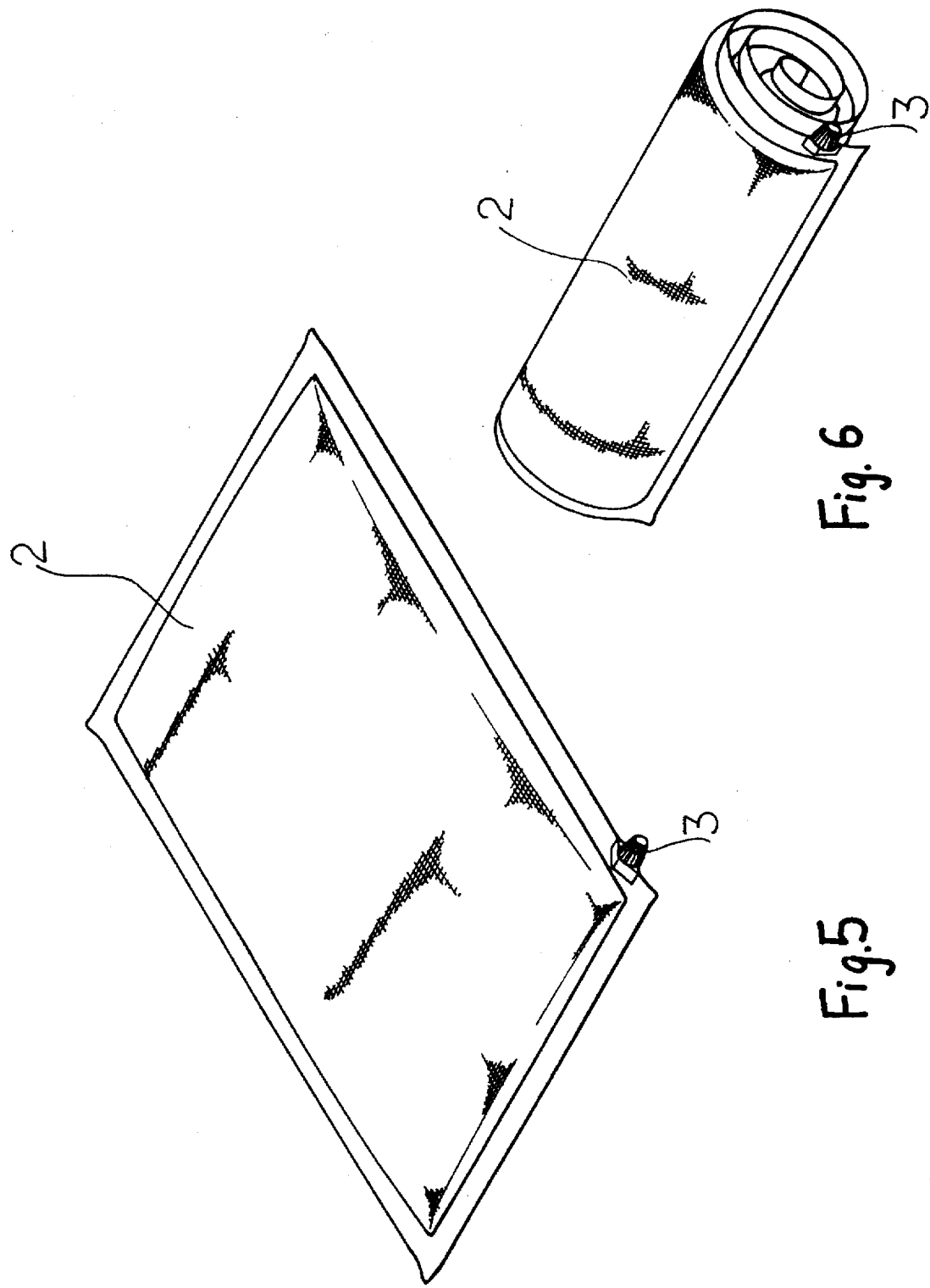

AIR MATTRESS STRUCTURE

BACKGROUND OF THE INVENTION

The present invention relates to an improved air mattress structure, especially to a water-tight and heat-insulating mattress having an air valve and a body made up of an upper layer, a first LLDPE (Line Low Density Polyethylene) layer, a first aluminum foil layer, a lower layer, a second LLDPE (Line Low Density Polyethylene) layer, a second aluminum foil layer, and a nylon layer sandwiched between the upper, lower layers and the first and second LLDPE and aluminum foil layers so as to prevent both the dissipation of heat and the encroachment of water when used in a cold weather or outdoors on a camping site or high mountain.

Please refer to FIG. 1. A conventional air mattress generally comprises a body 1 made up by an upper layer 11, a lower layer 13 with a sponge layer 12 sandwiched therebetween. The upper layer 11 is laminated above the sponge layer 12 while the lower layer 13 is applied under the sponge layer 12. When used as a sleeping bag outdoors on a high mountain or in cold weather, the conventional air mattress as shown in FIG. 2 tends to absorb water by the lower layer 13 and the water will gradually encroach and get the lower layer 13 wet, and even infiltrating into the sponge layer 12. Furthermore, due to its lack of insulating structure, the conventional air mattress cannot refrain from the dissipation of heat. When a user lies on the body 1, the heat of human body will drain and dissipate out of the air mattress by the upper layer 12, causing the user sleeping on it to feel colder and colder. Therefore, such conventional air mattress can provide neither water-tight nor heat-insulating properties.

SUMMARY OF THE PRESENT INVENTION

It is, therefore, the primary object of the present invention to provide an improved air mattress structure which can be both water-tight and heat-insulating. The improved air mattress structure can not only retard the encroachment of water into the air mattress but can also prevent the dissipation of heat out of the air mattress when used in cold weather or outdoors on a camping site or a high mountain, etc.

BRIEF DESCRIPTION OF THE DRAWINGS

FIG. 5 is a perspective view showing the present invention.

FIG. 6 is a perspective view showing the present invention.

DETAILED DESCRIPTION OF THE PREFERRED EMBODIMENTS

Figure 1:
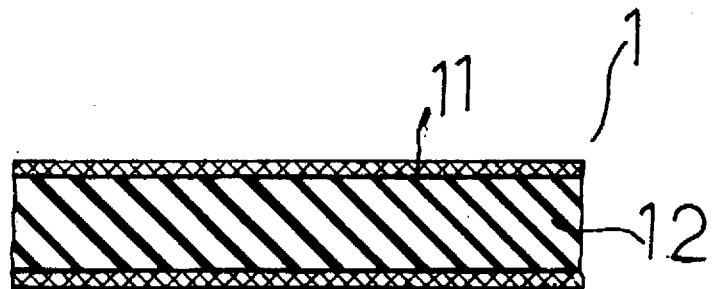
FIG. 1 is a partial sectional view of a conventional air mattress.
Figure 2:
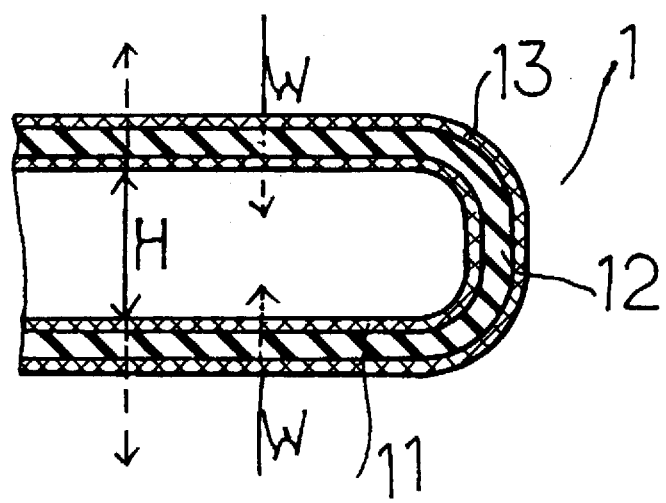
FIG. 2 is a diagram showing the embodiment of a conventional air mattress.
Figure 3:
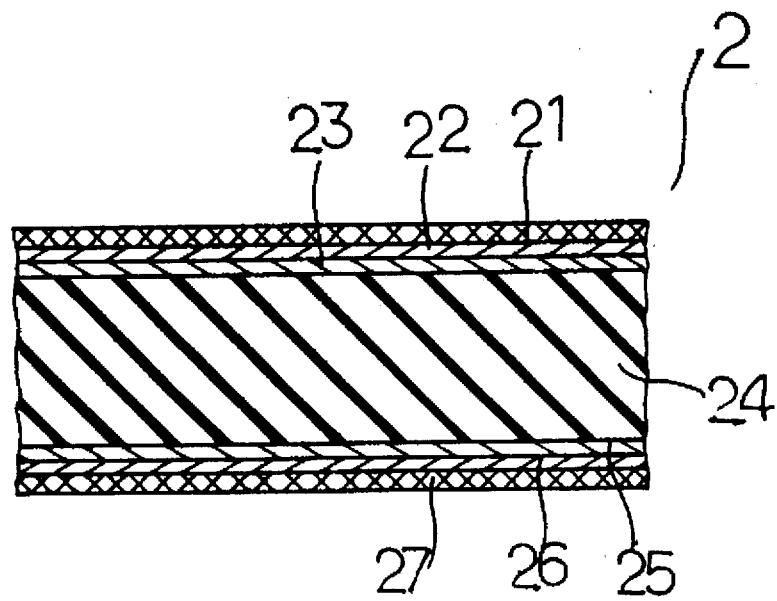
FIG. 3 is a partial sectional view of the present invention.
Figure 4:
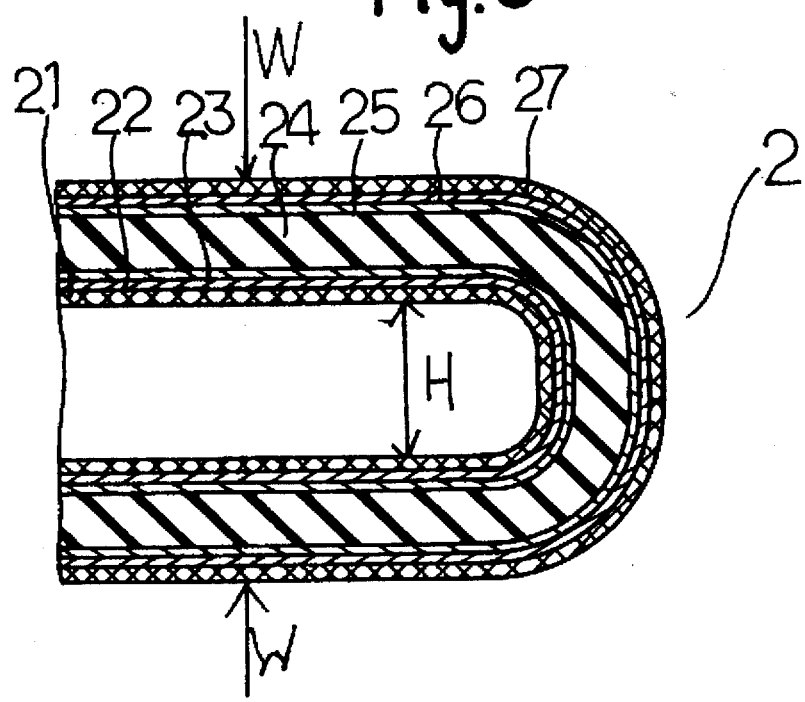
FIG. 4 is a diagram showing the embodiment of the present invention.

Please refer to FIGS. 3 to 5. The present invention is related to a water-tight and heat-insulating air mattress, comprising a body 2 and an air valve 3. The body 2 is made up of an upper layer 21, a first LLDPE (Line Low Density Polyethylene) layer 22, a first aluminum foil layer 23, a nylon layer 24, a second aluminum foil layer 25, a second LLDPE layer 26, and a lower layer 27.

The upper layer 21 is laminated on the first LLDPE layer 22, while the first LLDPE layer 22 is sandwiched between the upper layer 21 and the first aluminum foil layer 23. And the first aluminum foil layer 23 is applied on the nylon layer 24. Under the nylon layer 24 is applied the second aluminum foil layer 25 which then, like its opposite first layer, sandwiches the second LLDPE layer 26 between the second aluminum foil layer 25 and the lower layer 27. Thus the opposite layers are applied in the same order so as to laminate and sandwich the nylon layer 24 between the upper and lower laminae.

When the improved air mattress is in use, the air valve 3 is opened to allow the influx of air which will then expand the nylon layer 24 and get the air mattress inflated for use. When used as a seating mat or sleeping bag as shown in FIG. 4, the air mattress is placed on the ground. Though moisture is apt to infiltrate into the lower layer 27 when a user seats or sleeps on the mattress, it is refrained from encroaching into the inside of the air mattress for the second LLDPE layer 26 laminated on the lower layer 27 will retard the encroachment of water into the interior of the nylon layer 24. Besides, the heat of the human body will not dissipate upwards or downwards out of the air mattress by the upper layer 21 because the first aluminum foil layer applied on the nylon layer 24 possesses the effect of heat-insulating, thus keeping the heat inside the upper layer 21. So the user will not feel increasingly colder as a result of the dissipation of heat. Furthermore, due to its symmetrical design wherein one side is laminated in the same order as the opposite, the improved air mattress can be doubly used on both sides with the same effects of water-tight and heat-insulating.

Please refer to FIG. 6. When the air mattress is not in use, the body 2 can be rolled up for storage after squeezing the air out of the nylon layer 24, reducing the size of the nylon layer 24 and then getting closing the air valve 3. And because the laminae are quite thin, the improved air mattress is small enough in size and for easy carrying.

Figure 7:
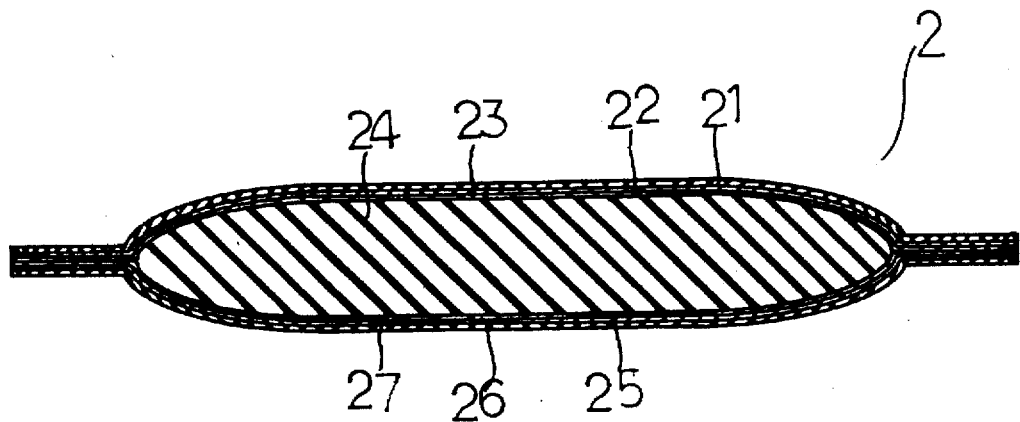
FIG. 7 is a sectional view showing a further embodiment of the present invention.

Please refer to FIG. 7. The nylon layer 24 is of a substantially oval cross-sectional configuration can be applied with glue fastener on its four sides so that the aluminum foil layers 23, 25 sandwiching the nylon layer 24 there-between will adhere completely and closely to said nylon layer 25. Furthermore, the first and second aluminum foil layers 23, 25 are closely adhered to the first and second LLDPE layers 22, 26 respectively, and the first and second LLDPE layers 22, 26 in turn to the upper and lower layers 21, 27 respectively. When the area of the laminated layers 21, 22, 23, 25, 26, 27 are larger than that of the nylon layer 24, the layers 21, 22, 23, 25, 26, 27 will enclose said nylon layer 24 in the middle as shown in FIG. 7.

Figure 8:
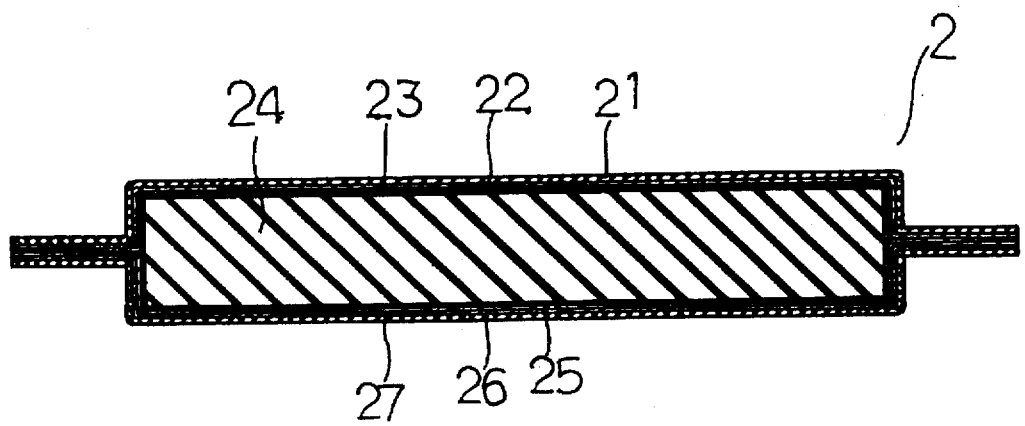
FIG. 8 is a sectional view showing still further embodiment of the present invention.

Please refer to FIG. 8. When the nylon layer 24 is of a substantially rectangular cross-sectional configuration sandwiched between the first and second aluminum foil layers 23, 25 and when the area of other layers 21, 22, 23, 25, 26, 27 is larger than that of the nylon layer 24, the nylon layer 24 can be enclosed in the middle of the laminated layers 21, 22, 23, 25, 26, 27 into another embodiment of the present invention as shown in FIG. 8.

What is claimed is:

1. A water-tight and heat-insulating air mattress comprising an air valve for inflating the mattress and a laminated mattress body including:

(a) an upper layer, a first line low density polyethylene layer, a first aluminum foil layer, a nylon layer, a second aluminum foil layer, a second line low density polyethylene layer and a lower layer; and (b) wherein the first low line density polyethylene layer is laminated between the upper layer and the first aluminum layer, the nylon layer is laminated between the first and second aluminum foil layers, and the second line low density polyethylene layer is laminated between the second aluminum foil layer and the lower layer.

2. The air mattress of claim 1 wherein:

(a) the nylon layer includes four sides and the first and second aluminum layers are secured to the nylon layer with glue; and (b) the surface area of each of the upper and lower layers, the first and second low line density polyethylene layers and the first and second aluminum foil layers is larger than the surface area of the nylon layer, whereby the nylon layer is tightly enclosed within the middle of the remaining laminated layers.

3. The air mattress of claim 1 wherein the surface area of each of the upper and lower layers, the first and second low line density polyethylene layers and the first and second aluminum foil layers is larger than the surface area of the nylon layer for enclosing all sides of the nylon layer in the middle of the remaining laminated layers.

* * * * *